(12) United States Patent
Kiritani et al.

(10) Patent No.: US 12,152,093 B2
(45) Date of Patent: Nov. 26, 2024

(54) TETRAFLUOROETHYLENE POLYMER, AIR FILTER MEDIUM, FILTER PACK, AND AIR FILTER UNIT

(71) Applicant: DAIKIN INDUSTRIES, LTD., Osaka (JP)

(72) Inventors: Emi Kiritani, Osaka (JP); Kunihiko Inui, Osaka (JP); Hideyuki Kiyotani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/312,045

(22) PCT Filed: Dec. 6, 2019

(86) PCT No.: PCT/JP2019/047961
§ 371 (c)(1),
(2) Date: Jun. 9, 2021

(87) PCT Pub. No.: WO2020/121981
PCT Pub. Date: Jun. 18, 2020

(65) Prior Publication Data
US 2021/0388127 A1 Dec. 16, 2021

(30) Foreign Application Priority Data

Dec. 10, 2018 (JP) ................. 2018-230700

(51) Int. Cl.
*B01D 39/00* (2006.01)
*B01D 39/08* (2006.01)
(Continued)

(52) U.S. Cl.
CPC ............ *C08F 14/26* (2013.01); *B01D 39/083* (2013.01); *B01D 39/16* (2013.01); *B01D 46/52* (2013.01);
(Continued)

(58) Field of Classification Search
CPC ....... C08F 14/26; B01D 39/083; B01D 39/16; B01D 46/52; B01D 2201/12; B01D 2257/204; C08J 2327/18
(Continued)

(56) References Cited

U.S. PATENT DOCUMENTS 4,541,825 A * 9/1985 Hyde .................. A24D 3/0233
493/42
5,834,528 A * 11/1998 Tanaka .................. B32B 27/28
521/145
(Continued)

FOREIGN PATENT DOCUMENTS

| CN | 101421319 B | 3/2012 |
|---|---|---|
| EP | 2 011 804 A1 | 1/2009 |

(Continued)

OTHER PUBLICATIONS

English translation of International Preliminary Report on Patentability and Written Opinion of the International Searching Authority for International Application No. PCT/JP2019/047961, dated Jun. 24, 2021.
(Continued)

*Primary Examiner* — T. Bennett McKenzie
(74) *Attorney, Agent, or Firm* — Birch, Stewart, Kolasch & Birch, LLP

(57) ABSTRACT

A tetrafluoroethylene polymer is provided in an air filter medium having a pressure loss that can be reduced and made uniform at a plurality of positions. The tetrafluoroethylene polymer may also be provided in an air filter medium, a filter pack, or an air filter unit. The tetrafluoroethylene polymer has drawability and non-melt processability. The tetrafluoroethylene polymer has a ratio $S_2/S_1$ of 0.60 or more, where $S_2$ represents an endotherm mJ/mg in a range of $T_0°$ C. or higher and 350° C. or lower, $T_0°$ C. is a temperature 2.5° C. lower than a temperature $T_p°$ C. ($340 \leq T_p \leq 345$) at which a (Continued)

minimum point is given on a heat-of-fusion curve obtained by measuring an unbaked polymer for measurement having no history of heating to a temperature of 300° C. or higher using a differential scanning calorimeter at a temperature-increasing rate of 2° C./min, and $S_1$ represents an endotherm mJ/mg in a range of 320° C. or higher and $T_0$° C. or lower.

13 Claims, 4 Drawing Sheets

(51) Int. Cl.
    *B01D 39/16*     (2006.01)
    *B01D 46/52*     (2006.01)
    *C08F 14/26*     (2006.01)

(52) U.S. Cl.
    CPC .... *B01D 2201/12* (2013.01); *B01D 2257/204* (2013.01); *C08J 2327/18* (2013.01)

(58) Field of Classification Search
    USPC .......................................................... 55/528
    See application file for complete search history.

(56) References Cited

U.S. PATENT DOCUMENTS

| | | | |
|---|---|---|---|
| 2002/0161149 A1 | 10/2002 | Kobayashi et al. | |
| 2009/0281231 A1* | 11/2009 | Kasai | C08F 114/26 524/546 |
| 2010/0319310 A1* | 12/2010 | Smith | B01D 39/163 55/527 |
| 2013/0267621 A1* | 10/2013 | Sawada | B01D 71/36 521/134 |
| 2014/0223872 A1* | 8/2014 | Bao | B01D 46/543 55/486 |
| 2014/0250846 A1* | 9/2014 | Walls | A62B 23/025 128/206.17 |
| 2015/0013295 A1* | 1/2015 | Uchiyama | B32B 27/30 442/364 |
| 2015/0082757 A1* | 3/2015 | Chaen | B01D 46/0001 55/482 |
| 2016/0289361 A1 | 10/2016 | Yamanaka et al. | |
| 2017/0001155 A1* | 1/2017 | Chaen | B01D 39/1692 |
| 2017/0002156 A1 | 1/2017 | Chaen et al. | |
| 2019/0344024 A1* | 11/2019 | Amirav | A61M 15/00 |

FOREIGN PATENT DOCUMENTS

| | | |
|---|---|---|
| EP | 3 061 512 A1 | 8/2016 |
| EP | 3 075 767 A1 | 10/2016 |
| JP | 2002-201217 A | 7/2002 |
| JP | 2010-37365 A | 2/2010 |
| JP | 2010037365 A * | 2/2010 |
| TW | 201834827 A | 10/2018 |
| WO | WO 2005/061567 A1 | 7/2005 |
| WO | WO 2007/119829 A1 | 10/2007 |
| WO | WO 2015/080289 A1 | 6/2015 |
| WO | WO 2015/080290 A1 | 6/2015 |
| WO | WO 2015/080291 A1 | 6/2015 |
| WO | WO-2017154980 A1 * | 9/2017 ............. B01D 39/14 |

OTHER PUBLICATIONS

International Search Report, issued in PCT/JP2019/047961, dated Feb. 18, 2020.
Written Opinion of the International Searching Authority, issued in PCT/JP2019/047961, dated Feb. 18, 2020.
Extended European Search Report for European Application No. 19895712.8, dated Jan. 7, 2022.

* cited by examiner

TETRAFLUOROETHYLENE POLYMER, AIR FILTER MEDIUM, FILTER PACK, AND AIR FILTER UNIT

TECHNICAL FIELD

The present disclosure relates to a tetrafluoroethylene polymer, an air filter medium, a filter pack, and an air filter unit.

BACKGROUND ART

Polytetrafluoroethylene (hereafter may be simply referred to as PTFE) has been used in various applications. For example, air-permeable fabric materials can be obtained by paste-extruding a PTFE fine powder and drawing the resulting extruded product in an unsintered state.

For example, PTL 1 (Japanese Unexamined Patent Application Publication No. 2002-201217) discloses that tetrafluoroethylene polymers having a standard specific gravity (SSG) of 2.160 or less have good drawing uniformity.

SUMMARY OF INVENTION

Technical Problem

However, in the case of producing an air filter medium from a tetrafluoroethylene polymer, it has not been studied at all to make the pressure loss uniform at a plurality of positions while reducing the pressure loss in the obtained air filter medium.

Solution to Problem

The tetrafluoroethylene polymer according to a first aspect is a tetrafluoroethylene polymer having drawability and non-melt processability. The tetrafluoroethylene polymer has a ratio $S_2/S_1$ of 0.60 or more. On a heat-of-fusion curve, $S_2$ represents an endotherm (mJ/mg) in a range of $T_0°$ C. or higher and 350° C. or lower and $S_1$ represents an endotherm (mJ/mg) in a range of 320° C. or higher and $T_0°$ C. or lower. $T_0°$ C. is a temperature 2.5° C. lower than a temperature $T_p°$ C. ($340 \leq T_p \leq 345$) at which a minimum point is given. The heat-of-fusion curve refers to a heat-of-fusion curve obtained by measuring an unbaked polymer for measurement having no history of heating to a temperature of 300° C. or higher using a differential scanning calorimeter at a temperature-increasing rate of 2° C./min. The tetrafluoroethylene polymer has a half-width HW of 5.0 or more. The half-width HW is a difference between temperatures at two intersection points of the heat-of-fusion curve and a line that is parallel to a baseline and that passes through a half position of a vertical line extending from the minimum point at the temperature $T_p°$ C. to the baseline.

The baseline refers to a line drawn by connecting the value at 305° C. and the value at 355° C. on the heat-of-fusion curve.

Since this tetrafluoroethylene polymer has a ratio $S_2/S_1$ of 0.60 or more, the proportion of relatively-low-molecular-weight polymers is small. Therefore, the unevenness of a drawn film caused by early extension of portions where low-molecular-weight polymers are present can be suppressed, and the uniformity of pressure loss at a plurality of positions of the obtained air filter medium can be improved.

In the heat-of-fusion curve, in general, the temperature on the horizontal axis correlates with the molecular weight, and the endotherm on the vertical axis correlates with the amount of polymer present. Here, the longer the baseline in the heat-of-fusion curve is, the more widely the molecular weight tends to be distributed. However, among high-molecular-weight and low-molecular-weight polymers, those near the baseline (the left end of $S_1$ and the right end of $S_2$) are present in a small amount or in a small proportion, and therefore have little adverse effect on the physical properties of the air filter medium. On the other hand, the half-width HW is far from the baseline, and the amount and proportion of polymer present are so large that the influence on the physical properties of the air filter medium cannot be neglected. This tetrafluoroethylene polymer has a half-width HW of 5.0 or more. Thus, even when the ratio $S_2/S_1$ is 0.60 or more and the proportion of relatively-high-molecular-weight polymers is high, the pressure loss of the air filter medium obtained by drawing can be reduced.

A tetrafluoroethylene polymer according to a second aspect is the tetrafluoroethylene polymer according to the first aspect, wherein the standard specific gravity is 2.140 or more and 2.165 or less.

This tetrafluoroethylene polymer is allowed to have good rollability and good drawability.

The "drawability" means that an unbaked molded body obtained from the tetrafluoroethylene polymer has drawing processability.

The "unbaked molded body" refers to a molded body composed of an unbaked polymer having no history of heating to a temperature equal to or higher than $T_p°$ C. at which a minimum point is given on a heat-of-fusion curve.

A tetrafluoroethylene polymer according to a third aspect is the tetrafluoroethylene polymer according to the first aspect or the second aspect, wherein the ratio $S_2/S_1$ is 0.95 or less.

This tetrafluoroethylene polymer can provide an air filter medium whose pressure loss can be reduced and made uniform at a plurality of positions.

A tetrafluoroethylene polymer according to a fourth aspect is the tetrafluoroethylene polymer according to the third aspect, wherein the ratio $S_2/S_1$ is less than 0.90.

In this tetrafluoroethylene polymer, moldability is easily improved.

A tetrafluoroethylene polymer according to a fifth aspect is the tetrafluoroethylene polymer according to any one of the first aspect to the fourth aspect, and is used for producing an air filter medium.

By using this tetrafluoroethylene polymer for producing an air filter medium, an air filter medium whose pressure loss is made uniform at a plurality of positions can be provided.

A tetrafluoroethylene polymer according to a sixth aspect is the tetrafluoroethylene polymer according to any one of the first aspect to the fifth aspect and is used for producing an air filter medium having a thickness of 1000 µm or less.

This tetrafluoroethylene polymer can provide an air filter medium whose thickness can be decreased and whose pressure loss can be made uniform at a plurality of positions.

A tetrafluoroethylene polymer according to a seventh aspect is the tetrafluoroethylene polymer according to any one of the first aspect to the sixth aspect, and is used for producing an air filter medium in which a collection efficiency of NaCl particles having a particle size of 0.3 µm is 99.97% or more when air containing the NaCl particles is passed through the air filter medium at a flow velocity of 5.3 cm/s.

This tetrafluoroethylene polymer can provide an air filter medium whose collection efficiency can be increased and whose pressure loss can be made uniform at a plurality of positions.

A tetrafluoroethylene polymer according to an eighth aspect is the tetrafluoroethylene polymer according to any one of the first aspect to the seventh aspect, and is used for producing an air filter medium having a pressure loss of 250 Pa or less when air is passed through the air filter medium at a flow velocity of 5.3 cm/s.

This tetrafluoroethylene polymer can provide an air filter medium whose pressure loss can be reduced and made uniform at a plurality of positions.

A tetrafluoroethylene polymer according to a ninth aspect is the tetrafluoroethylene polymer according to any one of the first aspect to the eighth aspect, and is used for producing an air filter medium having a coefficient of variation of pressure loss of 6.0 or less.

This tetrafluoroethylene polymer can provide an air filter medium whose pressure loss can be sufficiently made uniform at a plurality of positions.

An air filter medium according to a tenth aspect is produced using the tetrafluoroethylene polymer according to any one of the first aspect to the ninth aspect.

This air filter medium has good uniformity of pressure loss at a plurality of positions.

An air filter pack according to an eleventh aspect includes the air filter medium according to the tenth aspect, wherein the air filter medium is processed so as to have a zigzag shape in which mountain folds and valley folds are alternately repeated. The "filter pack" is not limited, and has, for example, a zigzag shape folded by alternately performing mountain folding and valley folding unlike a flat sheet-like shape. The filter pack may have a shape adjusted so as to be accommodated in a particular frame body.

An air filter unit according to a twelfth aspect includes the air filter medium according to the tenth aspect or the filter pack according to the eleventh aspect and a frame body holding the air filter medium or the filter pack.

DESCRIPTION OF EMBODIMENTS (1) Tetrafluoroethylene Polymer

Figure 1:
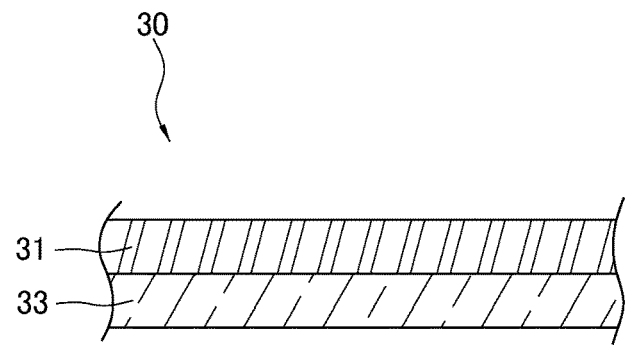
FIG. 1 is a schematic sectional view illustrating a layer structure of an air filter medium (part one).

The tetrafluoroethylene polymer according to the present disclosure is a tetrafluoroethylene polymer having drawability and non-melt processability. The term "non-melt processability" means that the polymer has a high melt viscosity and therefore does not readily flow in a molten state, which makes it difficult to perform melt fabrication. The tetrafluoroethylene polymer preferably has a melt viscosity at 380° C. of $1 \times 10^8$ Pa·S or more.

The tetrafluoroethylene polymer according to the present disclosure has a ratio $S_2/S_1$ of 0.60 or more, where $S_2$ represents an endotherm mJ/mg in the range of $T_0°$ C. or higher and 350° C. or lower, $T_0°$ C. is a temperature 2.5° C. lower than the temperature $T_p°$ C. ($340 \leq T_p \leq 345$) at which a minimum point is given on a heat-of-fusion curve obtained by measuring an unbaked polymer for measurement having no history of heating to a temperature of 300° C. or higher using a differential scanning calorimeter at a temperature-increasing rate of 2° C./min, and $S_1$ represents an endotherm mJ/mg in the range of 320° C. or higher and $T_0°$ C. or lower.

The "unbaked polymer for measurement" is a tetrafluoroethylene polymer having no history of heating to a temperature of 300° C. or higher. When the unbaked polymer for measurement has a minimum point (peak top) at lower than 340° C. in the heat-of-fusion curve, the film formability tends to be poor, which may make it difficult to perform drawing.

In the chart of the heat-of-fusion curve, the endotherm $S_2$ mJ/mg in the range of $T_0°$ C. or higher and 350° C. or lower corresponds to an area of a region surrounded by the heat-of-fusion curve and the baseline in the above temperature range. Similarly, the endotherm $S_1$ mJ/mg in the range of 320° C. or higher and $T_0°$ C. or lower corresponds to an area of a region surrounded by the heat-of-fusion curve and the baseline in the above temperature range. The baseline refers to a line drawn by connecting the value at 305° C. and the value at 355° C. in the heat-of-fusion curve.

By setting the temperature $T_0°$ C. to a boundary temperature used when the endotherms $S_2$ and $S_1$ are determined, the influence due to the difference in peak position and the like on the heat-of-fusion curve caused by different models of differential scanning calorimeters used is suppressed, and the ratio $S_2/S_1$ tends to be differentiated.

In the tetrafluoroethylene polymer according to the present disclosure, the ratio $S_2/S_1$ of the endotherm $S_2$ mJ/mg to the endotherm $S_1$ mJ/mg is 0.60 or more. The comparison between $S_2$ and $S_1$ shows the following. $S_2$ indicates the proportion of a polymer having a relatively high molecular weight in the whole unbaked polymer for measurement to be measured with the differential scanning calorimeter. On the other hand, $S_1$ indicates the proportion of a polymer having a relatively low molecular weight in the whole unbaked polymer for measurement. Since the tetrafluoroethylene polymer has a ratio $S_2/S_1$ of 0.60 or more, the amount of high-molecular-weight polymer is relatively large and, for example, the amount of low-molecular-weight polymer having a low heat of fusion in the heat-of-fusion curve is reduced.

It is generally believed that when tetrafluoroethylene polymers include short polymer molecular chains in a mixed manner, the polymer molecular chains are easily disentangled upon receiving a shearing force during drawing or the like. However, the tetrafluoroethylene polymer according to the present disclosure includes a relatively small amount of short polymer molecular chains and a relatively large amount of long polymer molecular chains. Therefore, it is believed that the entanglement between polymer molecules is easily maintained upon receiving a shear force, which can provide a drawn body having excellent film uniformity. The film uniformity of a drawn body obtained by using the tetrafluoroethylene polymer according to the present disclosure can be evaluated as uniformity of pressure loss determined when air is passed through a plurality of positions of a drawn body obtained by performing biaxial drawing or the like.

The uniform pressure loss of an air filter medium produced from the tetrafluoroethylene polymer is preferably, for example, a coefficient of variation CV of 5% or less as calculated by dividing the standard deviation of the pressure loss distribution by the average. The lower limit of the coefficient of variation CV is, for example, 1%. The pressure loss distribution of the filter medium is obtained by, for example, dividing the filter medium into 100 sections in a lattice manner and measuring the pressure loss in a region having a diameter of 100 mm in each section. The pressure loss can be measured by, for example, using a measuring instrument equipped with a manometer that measures both surfaces of the filter medium while being close to the surfaces of the filter medium. The measurement can be performed by operating the manometer so that the manometer moves along a predetermined path on the surface on the downstream side of each region. Then, the standard deviation is calculated from the pressure loss distribution composed of the measured pressure losses in the regions. The standard deviation can be divided by the average of the measured pressure losses in all the regions to determine a coefficient of variation CV (%). The size of the air filter medium is not limited. For example, the air filter medium has a length of 100 to 1000 m in the longitudinal direction and a length of 600 to 2000 mm in the width direction.

The ratio $S_2/S_1$ is preferably 0.65 or more and more preferably 0.70 or more. The upper limit of the ratio $S_2/S_1$ is preferably 0.95 or less from the viewpoint of easily reducing the pressure loss of the obtained air filter medium, and is preferably less than 0.90 from the viewpoint of easily improving the moldability.

The tetrafluoroethylene polymer according to the present disclosure has a half-width HW of 5.0 or more, where the half-width HW is a difference between temperatures at two intersection points of a heat-of-fusion curve and a line that is parallel to a baseline and that passes through a half position of a vertical line extending from a minimum point at the temperature $T_p°$ C. to the baseline.

In general, in the heat-of-fusion curve, the temperature on the horizontal axis correlates with the molecular weight, and the endotherm on the vertical axis correlates with the amount of polymer present. Here, the longer the baseline in the heat-of-fusion curve is, the more widely the molecular weight tends to be distributed. However, among high-molecular-weight and low-molecular-weight polymers, those near the baseline (the left end of $S_1$ and the right end of $S_2$) are present in a small amount or in a small proportion, and therefore have little adverse effect on the physical properties of the air filter medium. On the other hand, the half-width HW is far from the baseline, and the amount and proportion of polymer present are so large that the influence on the physical properties of the air filter medium cannot be neglected. Therefore, even when the ratio $S_2/S_1$ is 0.60 or more, it may be difficult to reduce the pressure loss of the obtained air filter medium, for example, in the case where the ratio of the low-molecular-weight polymer to the high-molecular-weight polymer is excessively small. In contrast, the tetrafluoroethylene polymer according to the present disclosure has a half-width HW of 5.0 or more. Thus, even when the ratio $S_2/S_1$ is 0.60 or more and the proportion of relatively-high-molecular-weight polymer is high, the pressure loss of the air filter medium obtained by drawing can be reduced. From the viewpoint of reducing the pressure loss of the air filter medium obtained by drawing, the half-width HW is preferably 6.0 or more, more preferably 7.5 or more, and further preferably 9.0 or more. From the viewpoint of suppressing a decrease in the uniformity of the pressure loss of the air filter medium due to the presence of many short polymer molecular chains, the half-width HW may be 20.0 or less and is preferably 15.0 or less.

The form of the tetrafluoroethylene polymer according to the present disclosure is not limited. For example, a tetrafluoroethylene polymer aqueous dispersion obtained by dispersing the tetrafluoroethylene polymer in an aqueous medium may be employed.

The standard specific gravity (SSG) of the tetrafluoroethylene polymer is preferably 2.140 or more and 2.165 or less from the viewpoint of improving the rollability and drawability. The standard specific gravity (SSG) of the tetrafluoroethylene polymer is preferably 2.160 or less from the viewpoint of providing a porous body having high breaking strength even when drawing is performed at a high drawing ratio. The standard specific gravity (SSG) is an index of an average molecular weight, and the average molecular weight generally increases as the standard specific gravity decreases. The standard specific gravity (SSG) is measured by water displacement conforming to ASTM D-792 using a sample molded in conformity with ASTM D4895-89.

The tetrafluoroethylene polymer is polytetrafluoroethylene (PTFE), and the PTFE may be a tetrafluoroethylene (TFE) homopolymer or a modified PTFE.

The "modified PTFE" refers to a TFE copolymer obtained by subjecting a trace amount of a monomer other than TFE to polymerization together with TFE without considerably impairing the properties of the TFE homopolymer. Examples of the monomer other than TFE include a fluorine-containing monomer having an ethylenically unsaturated group. Examples of the fluorine-containing monomer having an ethylenically unsaturated group include hexafluoropropylene (HFP), perfluoro(alkyl vinyl ether) (PAVE), chlorotrifluoroethylene (CTFE), (perfluoromethyl)ethylene, (perfluorobutyl)ethylene, perfluorobutene-1, perfluorohexene-1, and perfluorononene-1. Examples of the PAVE include perfluoro(methyl vinyl ether) (PMVE), perfluoro(ethyl vinyl ether) (PEVE), and perfluoro(propyl vinyl ether) (PPVE). The monomers other than TFE may be used alone or in combination of two or more. The total amount of repeating units based on the monomers other than TFE is preferably 1 mass % or less and more preferably 0.5 mass % or less relative to the total amount of repeating units based on all monomers constituting the tetrafluoroethylene polymer.

The tetrafluoroethylene polymer according to the present disclosure can be obtained by, for example, emulsion polymerization. Emulsion polymerization can be generally performed by polymerizing TFE or TFE and other copolymers in an aqueous medium containing a dispersant and a polymerization initiator.

In the emulsion polymerization, the polymerization temperature is generally 20 to 100° C. and preferably 50 to 85° C. The polymerization pressure is generally 0.5 to 3.0 MPa.

The polymerization initiator in the emulsion polymerization is preferably, for example, a radical polymerization initiator or a redox polymerization initiator. The amount of the polymerization initiator is preferably as small as possible from the viewpoint of suppressing formation of a tetrafluoroethylene polymer having a low molecular weight which impairs the uniformity of a drawn body and providing a tetrafluoroethylene polymer having a low SSG and a high ratio $S_2/S_1$. However, when the amount is excessively small, the polymerization rate tends to be excessively low. When the amount is excessively large, a tetrafluoroethylene polymer having a high SSG and a low ratio $S_2/S_1$ tends to be produced. The radical polymerization initiator is, for example, a water-soluble organic peroxide. A persulfate such as ammonium persulfate or potassium persulfate is preferable, and ammonium persulfate is more preferable. These radical polymerization initiators may be used alone or in combination of two or more. The amount of the radical polymerization initiator is preferably an amount corresponding to 1 to 100 ppm of the mass of the aqueous medium used and more preferably an amount corresponding to 1 to 10 ppm of the mass.

Examples of the redox polymerization initiator include combinations of water-soluble oxidizing agents such as a persulfate and a bromate with reducing agents such as a sulfite and a diimine. When a redox polymerization initiator is used as the polymerization initiator, a tetrafluoroethylene polymer having a low SSG and a high breaking strength can be obtained. The redox polymerization initiator is preferably used in an amount corresponding to 1 to 100 ppm, more preferably in an amount corresponding to 1 to 10 ppm, of the mass of the aqueous medium used.

The emulsion polymerization is preferably performed in the presence of one or more stabilizers. The stabilizer is preferably, for example, paraffin wax, a fluorine-based oil, a fluorine-based compound, or a silicone oil and particularly preferably paraffin wax. The melting point of the paraffin wax is preferably 40 to 65° C. and more preferably 50 to 65° C. The amount of the paraffin wax used is preferably an amount corresponding to 0.1 to 12 mass % and more preferably an amount corresponding to 0.1 to 8 mass % of the aqueous medium.

The emulsion polymerization is generally performed by mixing the above-mentioned TFE, a monomer other than TFE, a dispersant, and a polymerization initiator in an aqueous medium and gently stirring the mixture under stirring conditions set so that the produced tetrafluoroethylene polymer fine particles do not aggregate.

The tetrafluoroethylene polymer aqueous dispersion is generally prepared by dispersing the above-mentioned tetrafluoroethylene polymer fine particles in an aqueous medium in the presence of the above-mentioned dispersant. The tetrafluoroethylene polymer aqueous dispersion may be an aqueous dispersion that contains the above-described tetrafluoroethylene polymer according to the present disclosure and that is obtained by the above-described emulsion polymerization without being subjected to post-treatment, that is, may be an as-polymerized aqueous dispersion. Alternatively, the tetrafluoroethylene polymer aqueous dispersion may be subjected to post-treatment such as concentration or dilution after the above-described emulsion polymerization.

The tetrafluoroethylene polymer according to the present disclosure may constitute a fine powder obtained by emulsion polymerization. The fine powder can be obtained by collecting tetrafluoroethylene polymer fine particles from the tetrafluoroethylene polymer aqueous dispersion obtained by the above-described emulsion polymerization, aggregating the fine particles, and then drying the aggregated fine particles. The coagulation can be performed by adding a coagulant and stirring the aqueous dispersion, but is preferably performed by stirring the aqueous dispersion at high speed without adding a coagulant. The coagulant is preferably nitric acid, hydrochloric acid, ammonium carbonate, or alcohol and more preferably ammonium carbonate. The drying after aggregation is not limited, but is preferably performed at a temperature of 100 to 250° C., more preferably 130 to 200° C.

The PTFE fine powder can be obtained by emulsion copolymerization of TFE in the presence of a fluorine-containing surfactant having a Log POW of 3.4 or less.

A compound having a high Log POW is concerned about environmental load, and in view of this, a compound having a Log POW of 3.4 or less is preferably used. In the production of the fluorine-containing polymer by emulsion polymerization, ammonium perfluorooctanoate (PFOA) is mainly used as a surfactant. Since PFOA has a Log POW of 3.5, the surfactant is preferably changed to a fluorine-containing surfactant having a Log POW of 3.4 or less.

The fluorine-containing surfactant may have a Log POW of 2.5 or more or 3.0 or more.

The Log POW is a partition coefficient between 1-octanol and water, and is represented by log P (in the formula, P represents a ratio of the concentration of a fluorine-containing surfactant in octanol/the concentration of a fluorine-containing surfactant in water when an octanol/water (1:1) mixed solution containing the fluorine-containing surfactant is subjected to phase separation).

The octanol/water partition coefficient represented by Log POW is determined as follows. That is, standard substances (heptanoic acid, octanoic acid, nonanoic acid, and decanoic acid) having known octanol/water partition coefficients are subjected to HPLC under the conditions of column: TOSOH ODS-120T column (φ4.6 mm×250 mm), eluent: acetonitrile/0.6 mass % $HClO_4$ solution=1/1 (vol/vol %), flow velocity: 1.0 ml/min, sample amount: 300 μL, column temperature: 40° C., and detection light: UV 210 nm. A calibration curve is prepared from the elution times and known octanol/water partition coefficients. Based on this calibration curve, the octanol/water partition coefficient is calculated from the elution times of the sample liquid in HPLC.

The fluorine-containing surfactant having a Log POW of 3.4 or less is preferably a fluorine-containing anionic surfactant. Examples of the fluorine-containing anionic surfactant include those described in U.S. Patent Application Publication Nos. 2007/0015864, 2007/0015865, 2007/0015866, 2007/0276103, 2007/0117914, 2007/142541, and 2008/0015319, U.S. Pat. Nos. 3,250,808 and 3,271,341, Japanese Unexamined Patent Application Publication No. 2003-119204, International Publication Nos. 2005/042593, 2008/060461, 2007/046377, 2007/119526, 2007/046482, and 2007/046345.

The fluorine-containing surfactant having a Log POW of 3.4 or less is preferably at least one fluorine-containing surfactant selected from the group consisting of surfactants represented by general formula $CF_3$—$(CF_2)_4$—COOX (in the formula, X represents a hydrogen atom, $NH_4$, or an alkali metal), general formula $CF_3CF_2CF_2OCF(CF_3)COOX$ (in the formula, X represents a hydrogen atom, $NH_4$, or an alkali metal atom), general formula $CF_3OCF(CF_3)CF_2OCF(CF_3)$ COOX (in the formula, X represents a hydrogen atom, $NH_4$, or an alkali metal atom), and general formula $CF_3CF_2OCF_2CF_2OCF_2COOX$ (in the formula, X represents a hydrogen atom, $NH_4$, or an alkali metal atom).

The fluorine-containing surfactant having a Log POW of 3.4 or less may also be represented by general formula $CF_3OCF_2CF_2OCF_2CF_2COOX$ (in the formula, X represents a hydrogen atom, $NH_4$, or an alkali metal atom) or general formula $CF_3OCF_2CF_2CF_2OCHFCF_2COOX$ (in the formula, X represents a hydrogen atom, $NH_4$, or an alkali metal atom).

When the fluorine-containing surfactant is a salt, the counter ion forming the salt is, for example, an alkali metal ion or $NH_4^+$, and the alkali metal ion is, for example, $Na^+$ or $K^+$.

Examples of the fluorine-containing surfactant having a Log POW of 3.4 or less include $CF_3OCF(CF_3)CF_2OCF(CF_3)COOH$, $CF_3OCF(CF_3)CF_2OCF(CF_3)COONH_4$, $CF_3CF_2OCF_2CF_2OCF_2COOH$, $CF_3CF_2OCF_2CF_2OCF_2COONH_4$, $CF_3OCF_2CF_2CF_2OCHFCF_2COOH$, $CF_3OCF_2CF_2CF_2OCHFCF_2COONH_4$, $CF_3—(CF_2)_4—COOH$, $CF_3—(CF_2)_4—COONH_4$, $CF_3CF_2CF_2OCF(CF_3)COONH_4$, and $CF_3CF_2CF_2OCF(CF_3)COOH$.

The fine powder formed of the tetrafluoroethylene polymer according to the present disclosure normally has an average primary particle size of 0.1 to 0.5 μm, preferably 0.1 to 0.4 μm. Herein, the "primary particles" refer to particles formed of the tetrafluoroethylene polymer before the aggregation and having, after the polymerization reaction, no history of heat treatment at a temperature equal to or higher than the melting point of the tetrafluoroethylene polymer. The "average primary particle size" refers to a number-average particle size of the "primary particles". The "average primary particle size" is a value indirectly determined as follows. That is, a calibration curve of the transmittance of projected light at 550 nm per unit length and the average particle size determined from an electron micrograph is prepared for a tetrafluoroethylene polymer aqueous dispersion having a solid content of 0.15 mass %. The transmittance of a tetrafluoroethylene polymer aqueous dispersion to be measured is measured. The average primary particle size is determined based on the calibration curve. The average particle size of the fine powder is preferably 100 to 1000 μm and more preferably 400 to 600 μm. The average particle size is measured in conformity with ASTM D 1457.

The fine powder formed of the tetrafluoroethylene polymer according to the present disclosure has good extrudability, and can be paste-extruded at an extrusion pressure of, for example, 20 MPa or less. The extrusion pressure is a pressure measured when paste extrusion is performed through an orifice (diameter 2.5 cm, land length 1.1 cm, and entrance angle 30°) at a reduction ratio of 100, an extrusion speed of 51 cm/min, and a temperature of 25° C.

The fluororesin porous film produced from the tetrafluoroethylene polymer according to the present disclosure (and the air filter medium having the fluororesin porous film) has a uniform film appearance even when the total drawing ratio is 100 times on an area basis, for example.

The fine powder formed of the tetrafluoroethylene polymer can be paste-extruded, then rolled, and further drawn to obtain a drawn body.

In the paste extrusion, in general, the fine powder is mixed with an extrusion aid (lubricant), then premolded, and extruded. The extrusion aid is not limited, and a publicly known extrusion aid can be used. The extrusion aid is preferably a petroleum hydrocarbon having a boiling point of 150° C. or higher, such as naphtha. The amount of the extrusion aid added may be an amount corresponding to 10 to 40 mass % relative to the total mass of the fine powder and the extrusion aid. The premolding and extrusion can be performed by a publicly known method, and the conditions can be appropriately selected.

The rolling can be performed using rolls having a diameter of 300 to 700 mm. The thickness of the sheet obtained by rolling is preferably 50 to 500 μm and more preferably 100 to 300 μm. The drawing can be performed at a temperature of 100 to 300° C. The drawing speed and the drawing ratio can be appropriately selected in accordance with the desired product. In general, the drawing can be performed at a speed of 10 to 1000%/sec and a drawing ratio of 3 times (300%) or more. When heat setting is performed after the drawing in order to increase the strength and achieve dimensional stability, the heat-setting temperature is preferably 250 to 400° C.

Hereafter, a fluororesin porous film produced by using the above-described tetrafluoroethylene polymer, an air filter medium (hereafter also simply referred to as a filter medium) having the fluororesin porous film, a filter pack, an air filter unit, and the like will be described by taking examples.

(2) Fluororesin Porous Film

The thickness of the fluororesin porous film produced using the tetrafluoroethylene polymer is preferably 50.0 μm or less and more preferably 25.0 μm or less, and may be 15.0 μm or less. When the film thickness is small, the uniformity of pressure loss at a plurality of positions in the porous film tends to be more problematic. Even in such a case, the porous film produced using the tetrafluoroethylene polymer can have uniformity of pressure loss.

For the porous film produced using the tetrafluoroethylene polymer, the collection efficiency of NaCl particles having a particle size of 0.3 μm is preferably 99.97% or more and may be 99.99% or more when air containing the NaCl particles is passed through the porous film at a flow velocity of 5.3 cm/s.

The pressure loss of the porous film produced using the tetrafluoroethylene polymer is preferably 250 Pa or less and more preferably 20 Pa or more and 200 Pa or less.

The coefficient of variation of the pressure loss in the porous film produced using the tetrafluoroethylene polymer is preferably 6.0 or less and more preferably 5.0 or less. This makes it possible to avoid a reduction in collection efficiency due to the presence of portions having a low pressure loss.

(3) Air-Permeable Supporting Film

The air-permeable supporting film is disposed on the upstream side or the downstream side with respect to the fluororesin porous film or on both the upstream side and the downstream side so as to support the fluororesin porous film. Therefore, even if it is difficult to independently use the fluororesin porous film, for example, because of its small thickness, the support of the air-permeable supporting film allows the use of the fluororesin porous film. Furthermore, high strength of an air filter medium is achieved, which facilitates handling.

Non-limiting examples of the material and structure of the air-permeable supporting film include nonwoven fabric, woven fabric, metal mesh, and resin net. In particular, a nonwoven fabric having heat fusibility is preferred from the viewpoint of strength, collectability, flexibility, and workability. The nonwoven fabric is preferably a nonwoven fabric in which some or all of constituent fibers have a core/sheath structure, a two-layer nonwoven fabric including a fiber layer formed of a low-melting-point material and a fiber layer formed of a high-melting-point material, or a nonwoven fabric whose surface is coated with a heat fusible resin. Such a nonwoven fabric is, for example, a spun-bonded nonwoven fabric. The nonwoven fabric having a core/sheath structure is preferably a nonwoven fabric in which the core component has a higher melting point than the sheath component. Examples of the combination of materials for the core/sheath include PET/PE and high-melting-point polyester/low-melting-point polyester. Examples of the combination of the low-melting-point material/high-melting-point material for the two-layer nonwoven fabric include PE/PET, PP/PET, PBT/PET, and low-melting-point PET/high-melting-point PET. Examples of the nonwoven fabric whose surface is coated with a heat fusible resin include a PET nonwoven fabric whose surface is coated with EVA (ethylene-vinyl acetate copolymer resin) and a PET nonwoven fabric whose surface is coated with an olefin resin.

Non-limiting examples of the material for the nonwoven fabric include polyolefins (e.g., PE and PP), polyamides, polyesters (e.g., PET), aromatic polyamides, and composite materials of the foregoing.

The air-permeable supporting film can be joined to the fluororesin porous film by using an anchor effect due to partial melting of the air-permeable supporting film through heating or due to melting of a hot-melt resin, or by using adhesion of a reactive adhesive or the like.

The air-permeable supporting film has a pressure loss, a collection efficiency, and a dust-holding capacity much lower than those of the above-described fluororesin porous film. The pressure loss, the collection efficiency, and the dust-holding capacity may be values considered to be substantially zero. The pressure loss of the air-permeable supporting film is, for example, preferably 10 Pa or less, more preferably 5 Pa or less, and further preferably 1 Pa or less. The collection efficiency of polyalphaolefin particles having a particle size of 0.3 μm in the air-permeable supporting film may be, for example, a value considered to be substantially zero or about zero. The thickness of the air-permeable supporting film is, for example, preferably 0.3 mm or less and more preferably 0.25 mm or less. The basis weight of the air-permeable supporting film is, for example, preferably 20 g/m² or more and 50 g/m² or less.

(4) Air Filter Medium

The specific layer structure of the air filter medium described above is not limited. The following layer structures can be exemplified.

As in an air filter medium 30 in FIG. 1, the air filter medium may have a structure in which a fluororesin porous film 31 and an air-permeable supporting film 33 are stacked in the air flow direction. The air-permeable supporting film 33 may be disposed on the leeward side with respect to the fluororesin porous film 31, may be disposed on the windward side, or may be disposed on both the leeward side and the windward side.

Figure 2:
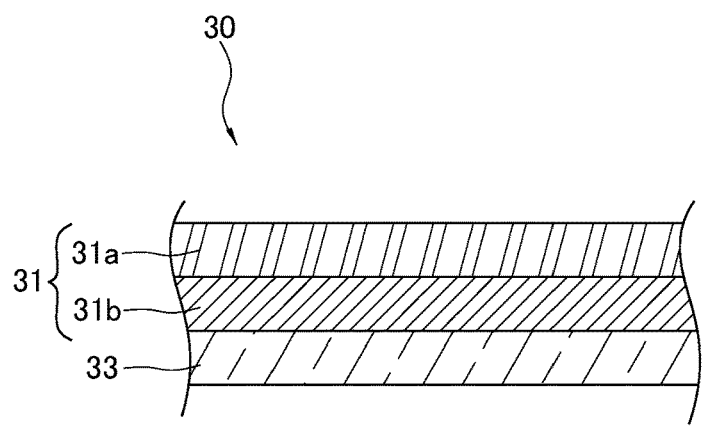
FIG. 2 is a schematic sectional view illustrating a layer structure of an air filter medium (part two).

As in an air filter medium 30 in FIG. 2, the air filter medium may have a structure in which a fluororesin porous film 31 including a first fluororesin porous film 31a and a second fluororesin porous film 31b disposed on the downstream side with respect to the first fluororesin porous film 31a, and an air-permeable supporting film 33 are stacked in the air flow direction. In this case, the air-permeable supporting film 33 may be disposed on the leeward side with respect to the first fluororesin porous film 31a and the second fluororesin porous film 31b, may be disposed on the windward side, or may be disposed on both the leeward side and the windward side. Alternatively, the air-permeable supporting film 33 may be disposed between the first fluororesin porous film 31a and the second fluororesin porous film 31b.

Figure 3:
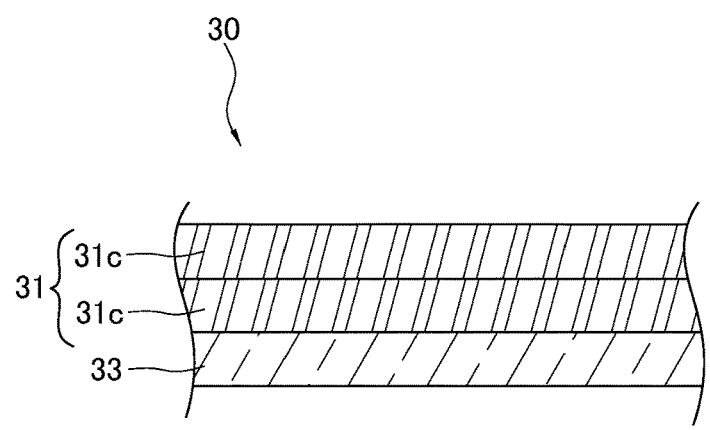
FIG. 3 is a schematic sectional view illustrating a layer structure of an air filter medium (part three).

As in an air filter medium 30 in FIG. 3, the air filter medium may have a structure in which a fluororesin porous film 31 including a plurality of (e.g., two) identical fluororesin porous films 31c and an air-permeable supporting film 33 are stacked in the air flow direction. In this case, the air-permeable supporting film 33 may also be disposed on the leeward side with respect to the plurality of identical fluororesin porous films 31c, may be disposed on the windward side, or may be disposed on both the leeward side and the windward side. Alternatively, the air-permeable supporting film 33 may be disposed between the plurality of identical fluororesin porous films 31c.

The method for stacking these films, layers, and the like is not limited. The films and layers may be bonded to each other by using an anchor effect provided by partial melting through heating or melting of a hot-melt resin, may be bonded to each other by using a reactive adhesive or the like, or may be simply placed on top of each other. The thickness of each film and each layer substantially does not change after the bonding.

The pressure loss of any of the air filter media is not limited, and is preferably, for example, 250 Pa or less and more preferably 20 Pa or more and 200 Pa or less.

In any of the air filter media, the collection efficiency of NaCl particles having a particle size of 0.3 μm is preferably 99.97% or more and may be 99.99% or more when air containing the NaCl particles is passed through the air filter medium at a flow velocity of 5.3 cm/s.

The thickness of the air filter medium is not limited, and is, for example, 50 μm or more and 1000 μm or less. The thickness is preferably 200 μm or more and 800 μm or less and more preferably 300 μm or more and 500 μm or less. The thickness of the air filter medium is a thickness measured when a load of 0.3 N is imposed on a measurement target in a particular measuring instrument.

(5) Filter Pack

Next, a filter pack according to this embodiment will be described with reference to FIG. 4.

Figure 4:
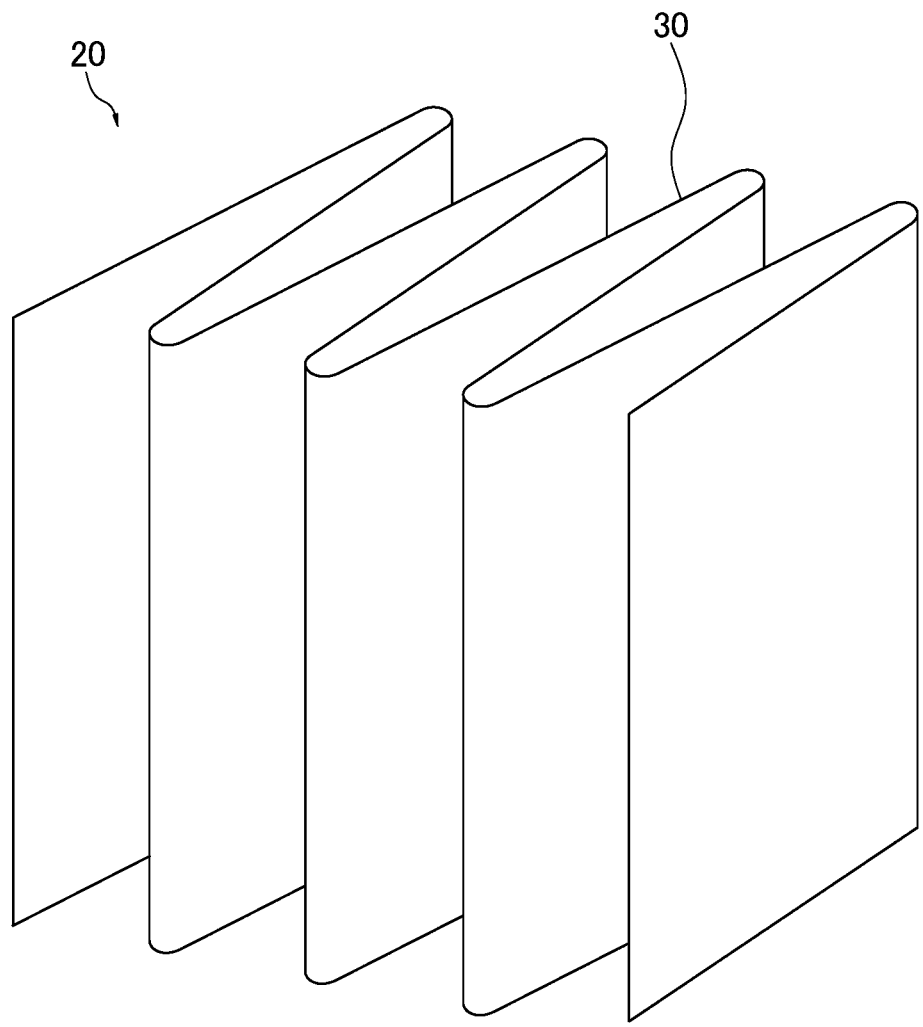
FIG. 4 is an external perspective view of a filter pack.

FIG. 4 is an external perspective view of a filter pack 20 according to this embodiment.

The filter pack 20 includes the above-described air filter medium (e.g., the air filter medium 30). The air filter medium of the filter pack 20 is a filter medium that has been processed so as to have a zigzag shape in which mountain folds and valley folds are alternately repeated (pleating). The pleating can be performed using, for example, a rotary folding machine. The folding width of the filter medium is not limited, and is, for example, 25 mm or more and 280 mm or less. By performing pleating, the folding area of the filter medium can be increased in the case where the filter pack 20 is used for an air filter unit. Thus, an air filter unit having high collection efficiency can be obtained.

The filter pack 20 may further include, in addition to the filter medium, spacers (not illustrated) for keeping pleat spacing when used for an air filter unit. The material for the spacers is not limited, and is preferably a hot-melt resin. The air filter medium 30 may have a plurality of embossed protrusions, and the pleat spacing may be kept by the embossed protrusions.

(6) Air Filter Unit

Next, an air filter unit 1 will be described with reference to FIG. 5.

Figure 5:
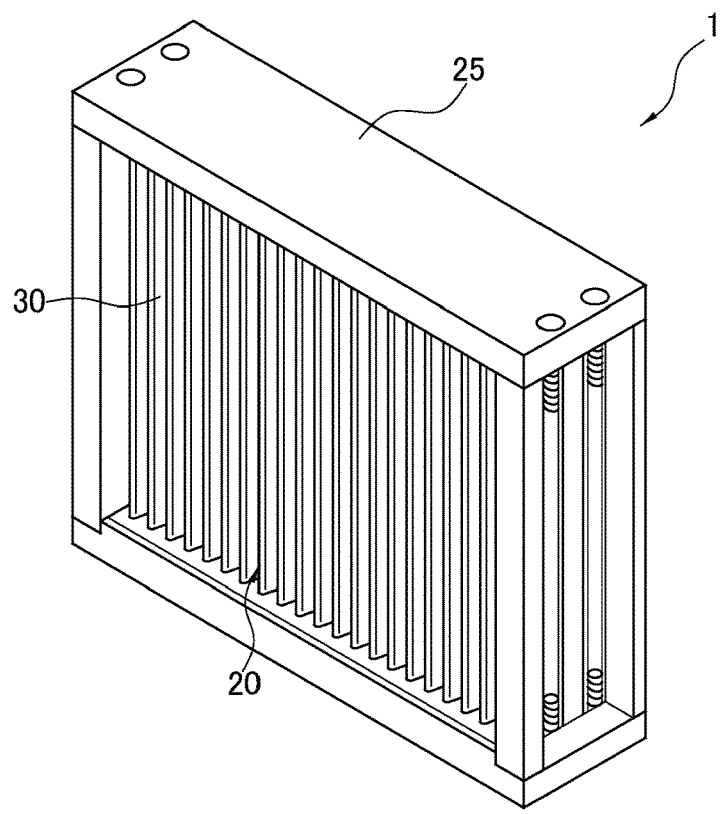
FIG. 5 is an external perspective view of an air filter unit.

FIG. 5 is an external perspective view of an air filter unit 1 according to this embodiment.

The air filter unit 1 includes the above-described air filter medium or filter pack and a frame body 25 that holds the air filter medium or the filter pack. In other words, the air filter unit may be produced such that a filter medium not subjected to mountain folding or valley folding is held by the frame body or such that the filter pack 20 is held by the frame body 25. The air filter unit 1 illustrated in FIG. 5 is produced using the filter pack 20 and the frame body 25.

The frame body 25 is produced by, for example, assembling boards or molding a resin, and the filter pack 20 and the frame body 25 are preferably sealed with each other using a sealer. The sealer is used to prevent leakage between the filter pack 20 and the frame body 25 and is formed of, for example, a resin such as an epoxy resin, an acrylic resin, or a urethane resin.

The air filter unit 1 including the filter pack 20 and the frame body 25 may be a mini-pleat air filter unit in which a single filter pack 20 extending in a flat-plate form is held so as to be accommodated inside the frame body 25 or may be a V-bank air filter unit or a single header air filter unit in which a plurality of filter packs extending in a flat-plate form are arranged and held in the frame body.

(7) Examples of Applications

The air filter medium, the filter pack, and the air filter unit are used for, for example, the following applications:
fields of, for example, ULPA filters (ultra low penetration air filters) (for producing semiconductors), HEPA filters (for hospitals and for producing semiconductors), cylindrical cartridge filters (for industrial use), bag filters (for industrial use), heat-resistant bag filters (for treating exhaust gas), heat-resistant pleated filters (for treating exhaust gas), SINBRAN (registered trademark) filters (for industrial use), catalyst filters (for treating exhaust gas), adsorbent-including filters (for installation in HDD), adsorbent-including vent filters (for installation in HDD), vent filters (e.g., for installation in HDD), filters for vacuum cleaners (for vacuum cleaners), general-purpose multilayered felt materials, cartridge filters for gas turbines (interchangeable components for gas turbines), and cooling filters (for casings of electronic devices); and
fields of materials for freeze-drying such as freeze-drying bottles, automobile ventilation materials for electronic circuits and lamps, bottle applications such as bottle caps, protective ventilation for electronic devices, and ventilation/internal pressure regulation such as medical ventilation.

EXAMPLES

Hereafter, the present disclosure will be specifically described based on Examples and Comparative Examples.

Example 1

To a SUS reaction vessel having an internal volume of 6 L and equipped with a stirrer, 3600 g of deionized water, 104 g of paraffin, and 5.4 g of $CF_3OCF(CF_3)CF_2OCF(CF_3)COONH_4$ were added. The reaction vessel was hermetically sealed and purged with nitrogen to remove oxygen. The temperature in the reaction vessel was increased to 70° C. The reaction vessel was filled with TFE, and the pressure in the reaction vessel was set to 0.78 MPa. As a polymerization initiator, 18.0 mg of ammonium persulfate was added. Since the polymerization pressure decreased, TFE was continuously supplied to the reaction vessel so that a constant pressure of 0.78 MPa was maintained. When the 1248 g of TFE was charged, 10.8 mg of hydroquinone was added. When 1900 g of TFE was charged, the supply of TFE and stirring were stopped to terminate the reaction. The reaction vessel was evacuated until the internal pressure of the reaction vessel reached atmospheric pressure, and the resulting product was removed from the reaction vessel and cooled. The supernatant paraffin wax was removed from the PTFE aqueous dispersion. The solid content of the obtained aqueous dispersion was 34.5 mass %.

The obtained PTFE aqueous dispersion was diluted with deionized water to a solid content of about 10 mass % and aggregated under high-speed stirring conditions. The aggregated wet powder was dried at 135° C. for 24 hours. Various physical properties ($T_0 (=T_p-2.5)$ (° C.), endothermic peak ratio $S_2/S_1$, half-width, and standard specific gravity (SSG)) of the obtained PTFE fine powder were measured.

Subsequently, 0.30 kg of a hydrocarbon oil ("IP Solvent 2028" manufactured by Idemitsu Kosan Co., Ltd.) was added per 1 kg of the obtained PTFE fine powder at 20° C., and mixing was performed.

This mixture was then molded into a round bar by paste extrusion. The round bar-shaped molded body was molded into a film using a calender roll heated to 70° C. to obtain a PTFE film. The PTFE film was passed through a hot-air drying furnace at 250° C. to evaporate the extrusion aid, thereby obtaining an unbaked film having an average thickness of 250 μm and an average width of 130 mm.

Figure 6:
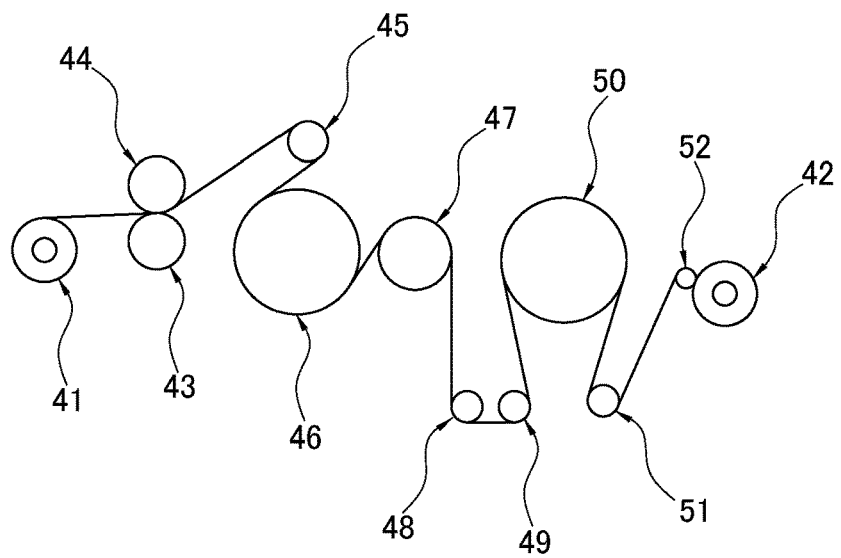
FIG. 6 schematically illustrates an apparatus used for drawing a PTFE film in a longitudinal direction.

Subsequently, the unbaked film was drawn at a drawing ratio of 6.7 times in the longitudinal direction using the apparatus illustrated in FIG. 6. The unbaked film was set on a roll 41, and the drawn film was wound on a winding roll 42. The drawing temperature was 250° C. In FIG. 6, the reference numerals 43 to 45 denote rolls, the reference numerals 46 and 47 denote heating rolls, and the reference numerals 48 to 52 denote rolls.

Subsequently, the obtained longitudinally drawn film was drawn in the width direction at a drawing ratio of 37 times using an apparatus (tenter) illustrated in the left half of FIG. 7 capable of sandwiching the film by continuous clipping, and heat setting was performed. At this time, the drawing temperature was 290° C. and the heat setting temperature was 360° C. Thus, a PTFE porous film was obtained. The thickness of the obtained PTFE porous film was measured, and the film appearance was evaluated.

Figure 7:
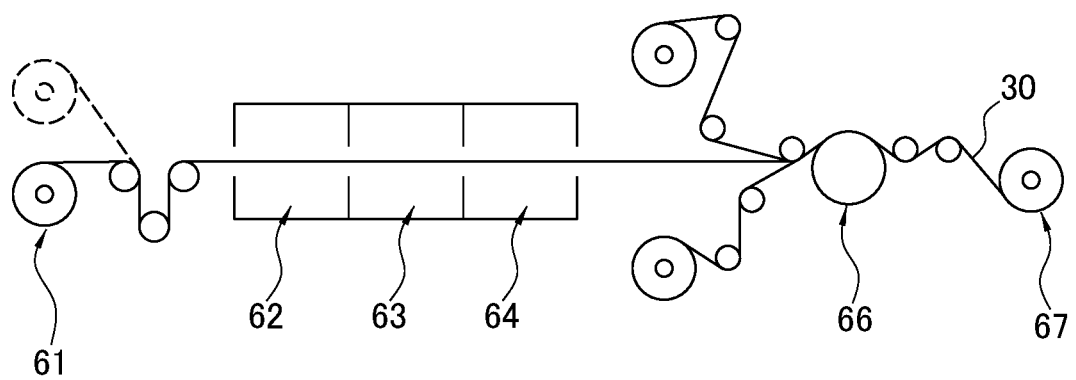
FIG. 7 schematically illustrates an apparatus (left half) used for drawing a PTFE film in a width direction and an apparatus (right half) for laminating a nonwoven fabric on the PTFE film.

The following nonwoven fabrics A and B were heat-fused to both surfaces of the above PTFE porous film using an apparatus illustrated in the right half of FIG. 7 to obtain an air filter medium.

Nonwoven fabric A: "Eleves 50403WDO" manufactured by Unitika Ltd., PET/PE core/sheath nonwoven fabric, basis weight 40 g/m$^2$ Nonwoven fabric B: "Eleves T0403WDO" manufactured by Unitika Ltd., PET/PE core/sheath nonwoven fabric, basis weight 40 g/m$^2$ In FIG. 7, the reference numeral 61 denotes an unwinding roll, the reference numeral 62 denotes a preheating zone, the reference numeral 63 denotes a drawing zone, the reference numeral 64 denotes a heat setting zone, the reference numeral 66 denotes a laminating roll, and the reference numeral 67 denotes a winding roll.

The heat-fusing conditions at this time were as follows.
Heating temperature: 200° C., Line speed: 15 m/min
The pressure loss, the coefficient of variation of the pressure loss, the collection efficiency (0.3 μm), and the collection efficiency (0.1 μm) of the air filter medium obtained as described above were measured.

Example 2

A PTFE aqueous dispersion was obtained in the same manner as in Example 1, except that hydroquinone was added when 756 g of TFE was charged, and the reaction was terminated when 1800 g of TFE was charged. The solid content of the obtained PTFE aqueous dispersion was 33.3 mass %. A PTFE fine powder was obtained by performing aggregation and drying in the same manner as in Example 1. Various physical properties of the obtained PTFE fine powder were measured.

The subsequent processes were the same as those in Example 1, such as molding the mixture obtained by mixing the PTFE fine powder with a hydrocarbon oil into a round bar by paste extrusion and molding the round bar into a film using a calender roll, drawing the obtained unbaked film in the longitudinal direction and the width direction, and providing nonwoven fabrics on both surfaces to obtain an air filter medium. The measurement of the thickness of the PTFE porous film, the evaluation of the film appearance, and the measurement of the pressure loss of the air filter medium, the coefficient of variation of the pressure loss, the collection efficiency (0.3 μm), and the collection efficiency (0.1 μm) were the same as those in Example 1.

Comparative Example 1

To a SUS reaction vessel having an internal volume of 6 L and equipped with a stirrer, 3600 g of deionized water, 180 g of paraffin, 5.4 g of $CF_3OCF(CF_3)CF_2OCF(CF_3)COONH_4$, and 25.2 g of oxalic acid were added. The reaction vessel was hermetically sealed and purged with nitrogen to remove oxygen. The temperature in the reaction vessel was increased to 70° C. The reaction vessel was filled with TFE, and the pressure in the reaction vessel was set to 2.70 MPa. As a polymerization initiator, a 0.01 mass % aqueous potassium permanganate solution was continuously added to the reaction vessel. Since the polymerization pressure decreased, TFE was continuously supplied to the reaction vessel so that a constant pressure of 2.70 MPa was maintained. When 1200 g of TFE was charged, the supply of TFE and stirring were stopped to terminate the reaction. Until the reaction was terminated, 46.8 g of the aqueous permanganate solution was charged. The reaction vessel was evacuated until the pressure in the reaction vessel reached atmospheric pressure, and the resulting product was removed from the reaction vessel and cooled. The supernatant paraffin wax was removed from the PTFE aqueous dispersion. The solid content of the obtained aqueous dispersion was 25.0 mass %.

The obtained PTFE aqueous dispersion was diluted with deionized water to a solid content of about 10 mass % and aggregated under high-speed stirring conditions. The aggregated wet powder was dried at 160° C. for 18 hours. Various physical properties of the obtained PTFE fine powder were measured.

Subsequently, 0.30 kg of a hydrocarbon oil was added per 1 kg of the obtained PTFE fine powder at 20° C., and mixing was performed.

The following processes were the same as those in Example 1, such as molding the mixture into a round bar by paste extrusion and molding the round bar into a film using a calender roll, drawing the obtained unbaked film in the longitudinal direction and the width direction, and providing nonwoven fabrics on both surfaces to obtain an air filter medium. The measurement of the thickness of the PTFE porous film, the evaluation of the film appearance, and the measurement of the pressure loss of the air filter medium, the coefficient of variation of the pressure loss, the collection efficiency (0.3 μm), and the collection efficiency (0.1 μm) were the same as those in Example 1.

Comparative Example 2

A PTFE aqueous dispersion was obtained in the same manner as in Comparative Example 1, except that 54.0 g of an aqueous permanganate solution was charged before the reaction was terminated. The solid content of the obtained PTFE aqueous dispersion was 25.0 mass %. A PTFE fine powder was obtained by performing aggregation and drying in the same manner as in Comparative Example 1. Various physical properties of the obtained PTFE fine powder were measured.

The subsequent processes were the same as those in Example 1, such as molding the mixture obtained by mixing the PTFE fine powder with a hydrocarbon oil into a round bar by paste extrusion and molding the round bar into a film using a calender roll, drawing the obtained unbaked film in the longitudinal direction and the width direction, and providing nonwoven fabrics on both surfaces to obtain an air filter medium. The measurement of the thickness of the PTFE porous film, the evaluation of the film appearance, and the measurement of the pressure loss of the air filter medium, the coefficient of variation of the pressure loss, the collection efficiency (0.3 μm), and the collection efficiency (0.1 μm) were the same as those in Example 1.

Comparative Example 3

A PTFE aqueous dispersion was obtained in the same manner as in Comparative Example 1, except that 360 mg of succinic acid was charged into the reaction vessel before the reaction, 32.4 g of a 0.01 mass % aqueous permanganate solution was charged, and the reaction was terminated when 1650 g of TFE was charged. The solid content of the obtained PTFE aqueous dispersion was 31.4 mass %. A PTFE fine powder was obtained by performing aggregation and drying in the same manner as in Comparative Example 1. Various physical properties of the obtained PTFE fine powder were measured.

The subsequent processes were the same as those in Example 1, such as molding the mixture obtained by mixing the PTFE fine powder with a hydrocarbon oil into a round bar by paste extrusion and molding the round bar into a film using a calender roll, drawing the obtained unbaked film in the longitudinal direction and the width direction, and providing nonwoven fabrics on both surfaces to obtain an air filter medium. The measurement of the thickness of the PTFE porous film, the evaluation of the film appearance, and the measurement of the pressure loss of the air filter medium, the coefficient of variation of the pressure loss, the collection efficiency (0.3 μm), and the collection efficiency (0.1 μm) were the same as those in Example 1.

The physical properties measured in Examples and Comparative Examples are as follows.

(Solid content)

One gram of the aqueous dispersion was dried in an air dryer at 150° C. for 60 minutes. The percentage of the mass of the residue after heating relative to the mass (1 g) of the aqueous dispersion was employed.

(Measurement of Melting Point $T_p$ and Ratio $S_2/S_1$)
(a) The differential scanning calorimetry (DSC) was performed using an RDC220 (manufactured by SII NanoTechnology Inc.) temperature-calibrated in advance using indium and lead as standard samples by inserting about 3 mg of a tetrafluoroethylene (TFE) polymer fine powder in an aluminum pan (crimp container) and increasing the temperature in a temperature range of 270 to 370° C. at 2° C./min under an air flow with 200 ml/min. Note that indium, lead, and tin were used as standard samples to calibrate the amount of heat, and an empty aluminum pan was sealed and used for measurement reference.
(b) The obtained heat-of-fusion curve was normalized using Muse standard analysis software (manufactured by SII NanoTechnology Inc.) so that the sample amount was 3.0 mg, and the analysis range for determining the amount of heat of fusion on the heat-of-fusion curve was defined to be 305 to 355° C. The temperature showing the minimum point of the amount of heat of fusion in this analysis range was defined as the melting point $T_p$. In the analysis range, the heat-of-fusion curve was vertically divided at (i) 320° C., (ii) $T_0$ (=$T_p$-2.5) ° C., and (iii) 350° C. Furthermore, (c) the endotherm $S_1$ (mJ/mg) in the range of 320 to $T_0$° C. and the endotherm $S_2$ (mJ/mg) in the range of $T_0$ to 350° C. were calculated, and the ratio $S_2/S_1$ of $S_2$ to $S_1$ was determined based on the calculated values.
(Half-Width)
For the heat-of-fusion curve, the width at the half position of a vertical line extending from the minimum point at the temperature $T_p$° C. to the baseline was determined as a half-width. Specifically, the difference between temperatures at two intersection points of the heat-of-fusion curve and a line parallel to the baseline passing through a half position of the vertical line extending from the minimum point at the temperature $T_p$° C. to the baseline was determined as the half-width.

The baseline refers to a line drawn by connecting the value at 305° C. and the value at 355° C. on the heat-of-fusion curve.
(Standard Specific Gravity (SSG))
The standard specific gravity (SSG) was measured by water displacement conforming to ASTM D-792 using a sample molded in conformity with ASTM D4895-89.
(Film Appearance)
The appearance of the obtained PTFE porous film was visually evaluated. In the evaluation, a sample having excellent uniformity was evaluated as A, a sample having good uniformity was evaluated as B, and a sample having much nonuniformity was evaluated as C.
(Pressure Loss of Air Filter Medium)
A sample of the air filter medium having a fluororesin porous film was set in a cylindrical filter medium holder with a diameter of 100 mm. The pressure on the inlet side was increased using a compressor to adjust the air flow so that the velocity of air passing through the filter medium was 5.3 cm/s. The pressures on the upstream and downstream sides of the test sample were measured with manometers. The difference between the pressures on the upstream and downstream sides was determined as the pressure loss.

(Coefficient of Variation of Pressure Loss)
From a long filter medium (650 mm in the width direction) wound in a roll shape, a portion having a length of about 5 m and including the tip was drawn out. The filter medium was divided into 25 sections each having 200 mm in the longitudinal direction of the filter medium and into four sections each having 130 mm in the width direction except both ends to obtain 100 sections in a lattice manner. A filter holder having a diameter of 100 mm was used to measure the pressure loss at the 100 sections. The measurement of the pressure loss was performed by continuously measuring the pressure loss at a plurality of lattice sections while moving the filter medium in the longitudinal direction using a measuring apparatus equipped with five or more filter holders in the width direction of the filter medium. Then, the standard deviation was determined from the pressure loss distribution composed of the measured pressure losses. The determined standard deviation was divided by the average of the measured pressure losses in all the sections to determine a coefficient of variation (%).
(Collection Efficiency of Air Filter Medium (NaCl Particles Having Particle Size of 0.3 μm))
NaCl particles generated with an atomizer in conformity to the NaCl aerosol generating method (pressurized atomizing method) in JIS B9928 Appendix 5 (specification) were classified using an electrostatic classifier (manufactured by TSI Incorporated) into particles having a particle size of 0.3 μm. The charge on the particles was neutralized using americium-241. Then, the flow velocity at which the particles passed through the air filter medium was adjusted to 5.3 cm/s. The numbers of particles before and after passage through the filter medium serving as a measurement sample were determined using a particle counter (CNC manufactured by TSI Incorporated), and the collection efficiency was calculated from the following formula.

Collection efficiency (%)=(CO/CI)×100

CO: Number of 0.3 μm NaCl particles collected by the measurement sample
CI: Number of 0.3 μm NaCl particles supplied to the measurement sample (Collection efficiency of air filter medium (NaCl particles having particle size of 0.1 μm))
The collection efficiency was calculated in the same manner as in the calculation of the collection efficiency using the NaCl particles having a particle size of 0.3 μm, except that NaCl particles having a particle size of 0.1 μm were used instead of the NaCl particles having a particle size of 0.3 μm.
(Thickness of Fluororesin Porous Film)
The film thickness of one layer was determined by stacking five layers to be measured, measuring the total thickness of the five layers using a thickness meter (1D-110MH, manufactured by Mitutoyo Corporation), and dividing the total thickness by 5.

Table below shows the physical properties of the PTFE fine powder, the PTFE porous film, and the air filter medium (not a filter pack or an air filter unit, but a planar filter medium) in each of Examples and Comparative Examples.

TABLE 1

|  | Example 1 | Example 2 | Comparative Example 1 | Comparative Example 2 | Comparative Example 3 |
| --- | --- | --- | --- | --- | --- |
| $T_0$ (° C.) | 340.7 | 340.8 | 340.5 | 340.2 | 341.4 |
| Endothermic peak ratio $S_2/S_1$ | 0.77 | 0.92 | 0.57 | 0.59 | 1.24 |

TABLE 1-continued

|  | Example 1 | Example 2 | Comparative Example 1 | Comparative Example 2 | Comparative Example 3 |
|---|---|---|---|---|---|
| Half-width | 13.1 | 10.3 | 13.7 | 12.9 | 4.9 |
| Standard specific gravity (SSG) | 2.160 | 2.160 | 2.158 | 2.158 | 2.153 |
| Film appearance | B | B | C | C | A |
| Pressure loss of filter medium (Pa) | 167 | 172 | 178 | 164 | 338 |
| Coefficient of variation of pressure loss | 4.0 | 3.6 | 7.0 | 8.0 | 5.2 |
| Collection efficiency (0.3 μm) (%) | 99.99 or more | | | | — |
| Collection efficiency (0.1 μm) (%) | 99.9992 | 99.9994 | 99.9989 | 99.9918 | — |
| Thickness of porous film (μm) | 8 | 7 | 5 | 5 | 8 |

The embodiments of the present disclosure have been described, but it should be understood that configurations and details can be modified in various ways without departing from the spirit and scope of the present disclosure as defined in the claims.

REFERENCE SIGNS LIST 1 air filter unit
20 filter pack
25 frame body
30 air filter medium
31 fluororesin porous film
31a first fluororesin porous film
31b second fluororesin porous film
33 air-permeable supporting film

CITATION LIST

Patent Literature

PTL 1: Japanese Unexamined Patent Application Publication No. 2002-201217

The invention claimed is:

1. An air filter medium, comprising:
a tetrafluoroethylene-polymer-drawn-porous-film having a thickness of 15.0 μm or less, and having a coefficient of variation of pressure loss of 5.0 or less,
wherein the tetrafluoroethylene polymer has drawability and non-melt processability,
wherein the tetrafluoroethylene polymer has a standard specific gravity of 2.158 or more,
wherein the tetrafluoroethylene polymer has a ratio $S_2/S_1$ of 0.70 or more and 0.90 or less, where $S_2$ represents an endotherm mJ/mg in a range of $T_0$° C. or higher and 350° C. or lower, $T_0$° C. is a temperature 2.5° C. lower than a temperature $T_p$° C. ($340 \leq T_p \leq 345$) at which a minimum point is given on a heat-of-fusion curve obtained by measuring an unbaked polymer for measurement having no history of heating to a temperature of 300° C. or higher using a differential scanning calorimeter at a temperature-increasing rate of 2° C./min, and $S_1$ represents an endotherm mJ/mg in a range of 320° C. or higher and $T_0$° C. or lower, and
in the heat-of-fusion curve, a half-width HW that is a difference between temperatures at two intersection points of the heat-of-fusion curve and a line which is parallel to a baseline and passes through a half position of a vertical line extending from the minimum point at the temperature $T_p$° C. to the baseline is 6.0 or more.

2. The air filter medium according to claim 1, wherein the tetrafluoroethylene polymer has a standard specific gravity of 2.158 or more and 2.165 or less.

3. The air filter medium according to claim 1, wherein the ratio $S_2/S_1$ is 0.70 or more and less than 0.90.

4. The air filter medium according to claim 1, wherein the air filter medium has a thickness of 1000 μm or less.

5. The air filter medium according to claim 1, wherein the air filter medium has a collection efficiency of NaCl particles having a particle size of 0.3 μm is 99.97% or more when air containing the NaCl particles is passed through the air filter medium at a flow velocity of 5.3 cm/s.

6. The air filter medium according to claim 1, wherein the air filter medium has a pressure loss of 250 Pa or less when air is passed through the air filter medium at a flow velocity of 5.3 cm/s.

7. A filter pack comprising: the air filter medium according to claim 1, wherein the air filter medium is processed so as to have a zigzag shape in which mountain folds and valley folds are alternately repeated.

8. An air filter unit comprising: the air filter medium according to claim 1; and a frame body holding the air filter medium.

9. The air filter medium according to claim 2, wherein the ratio $S_2/S_1$ is 0.70 or more and less than 0.90.

10. The air filter medium according to claim 2, wherein the air filter medium has a thickness of 1000 μm or less.

11. The air filter medium according to claim 3, wherein the air filter medium has a thickness of 1000 μm or less.

12. The air filter medium according to claim 2, wherein the air filter medium has a collection efficiency of NaCl particles having a particle size of 0.3 μm is 99.97% or more when air containing the NaCl particles is passed through the air filter medium at a flow velocity of 5.3 cm/s.

13. The air filter medium according to claim 3, wherein the air filter medium has a collection efficiency of NaCl particles having a particle size of 0.3 μm is 99.97% or more when air containing the NaCl particles is passed through the air filter medium at a flow velocity of 5.3 cm/s.

\* \* \* \* \*